(12) United States Patent
Bakalski et al.

(10) Patent No.: US 8,326,234 B2
(45) Date of Patent: Dec. 4, 2012

(54) HIGH FREQUENCY SWITCHING CIRCUIT AND METHOD FOR DETERMINING A POWER OF A HIGH FREQUENCY SIGNAL

(75) Inventors: Winfried Bakalski, Munich (DE); Hans Taddiken, Munich (DE); Nikolay Ilkov, Munich (DE); Herbert Kebinger, Mettenheim (DE)

(73) Assignee: Infineon Technologies AG, Neubiberg (DE)

( * ) Notice: Subject to any disclaimer, the term of this patent is extended or adjusted under 35 U.S.C. 154(b) by 48 days.

(21) Appl. No.: 12/705,145

(22) Filed: Feb. 12, 2010

(65) Prior Publication Data

US 2011/0201281 A1   Aug. 18, 2011

(51) Int. Cl.
*H04B 1/44* (2006.01)
*H01P 1/10* (2006.01)

(52) U.S. Cl. .......................................... 455/78; 333/103

(58) Field of Classification Search ............... 455/73, 455/78; 333/176, 103; 327/355, 436; 330/253, 330/291
See application file for complete search history.

(56) References Cited

U.S. PATENT DOCUMENTS

| | | | |
|---|---|---|---|
| 5,005,008 A * | 4/1991 | King | 340/653 |
| 7,564,103 B2 | 7/2009 | Losehand et al. | |
| 2005/0118976 A1 * | 6/2005 | Murakami et al. | 455/313 |
| 2005/0179506 A1 * | 8/2005 | Takahashi et al. | 333/104 |
| 2006/0010330 A1 * | 1/2006 | Wu et al. | 713/300 |
| 2006/0118884 A1 | 6/2006 | Losehand et al. | |
| 2007/0008038 A1 | 1/2007 | Klepser et al. | |
| 2007/0132502 A1 * | 6/2007 | Kollner et al. | 327/427 |
| 2009/0039869 A1 * | 2/2009 | Williams | 324/123 R |
| 2009/0058574 A1 * | 3/2009 | Stiedl | 335/18 |
| 2009/0278206 A1 | 11/2009 | Losehand et al. | |
| 2009/0291645 A1 | 11/2009 | Chu et al. | |
| 2009/0316743 A1 * | 12/2009 | Alfrey | 372/38.04 |
| 2010/0085037 A1 * | 4/2010 | Ning et al. | 324/140 R |

FOREIGN PATENT DOCUMENTS

| | | |
|---|---|---|
| DE | 10 2005 049 247 A1 | 5/2006 |
| DE | 10 2005 061 572 A1 | 1/2007 |
| SU | 1386932 A * | 4/1988 |

* cited by examiner

*Primary Examiner* — Temesghen Ghebretinsae
*Assistant Examiner* — Gennadiy Tsvey
(74) *Attorney, Agent, or Firm* — Slater & Matsil, L.L.P.

(57) ABSTRACT

A high frequency switching circuit, including a high frequency switching element. The high frequency switching element including a first channel terminal and a second channel terminal, wherein the high frequency switching element is configured to switchably route a high frequency signal via a channel path between the first channel terminal and the second channel terminal. The high frequency switching circuit further includes a power detection circuit, wherein the power detection circuit is configured to obtain a first measurement signal from the first channel terminal and a second measurement signal from the second channel terminal, and to combine the first measurement signal and the second measurement signal to derive, in dependence on both the first measurement signal and the second measurement signal, a power signal describing a power value of the high frequency signal routed via the channel path of the high frequency switching element.

20 Claims, 13 Drawing Sheets

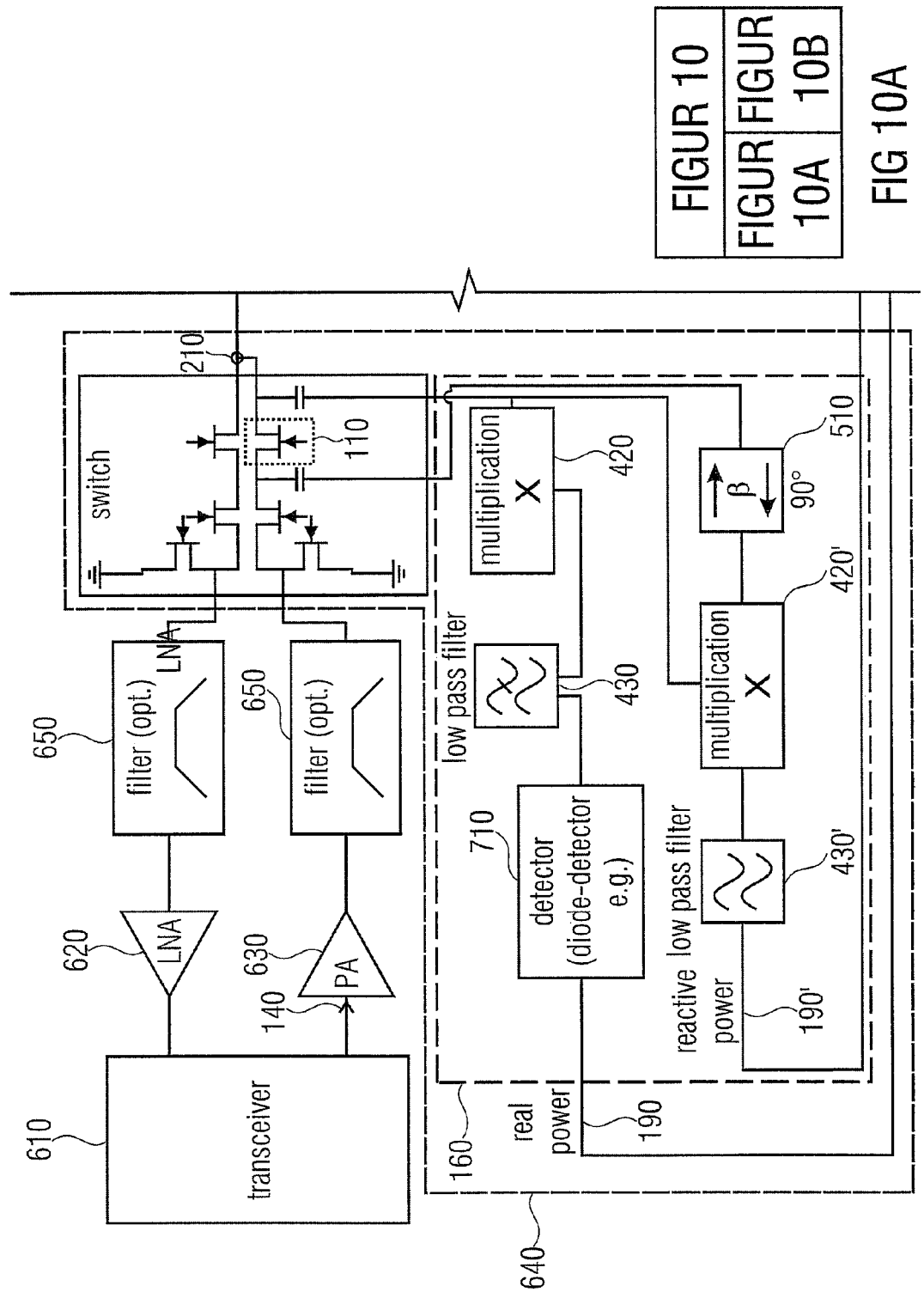

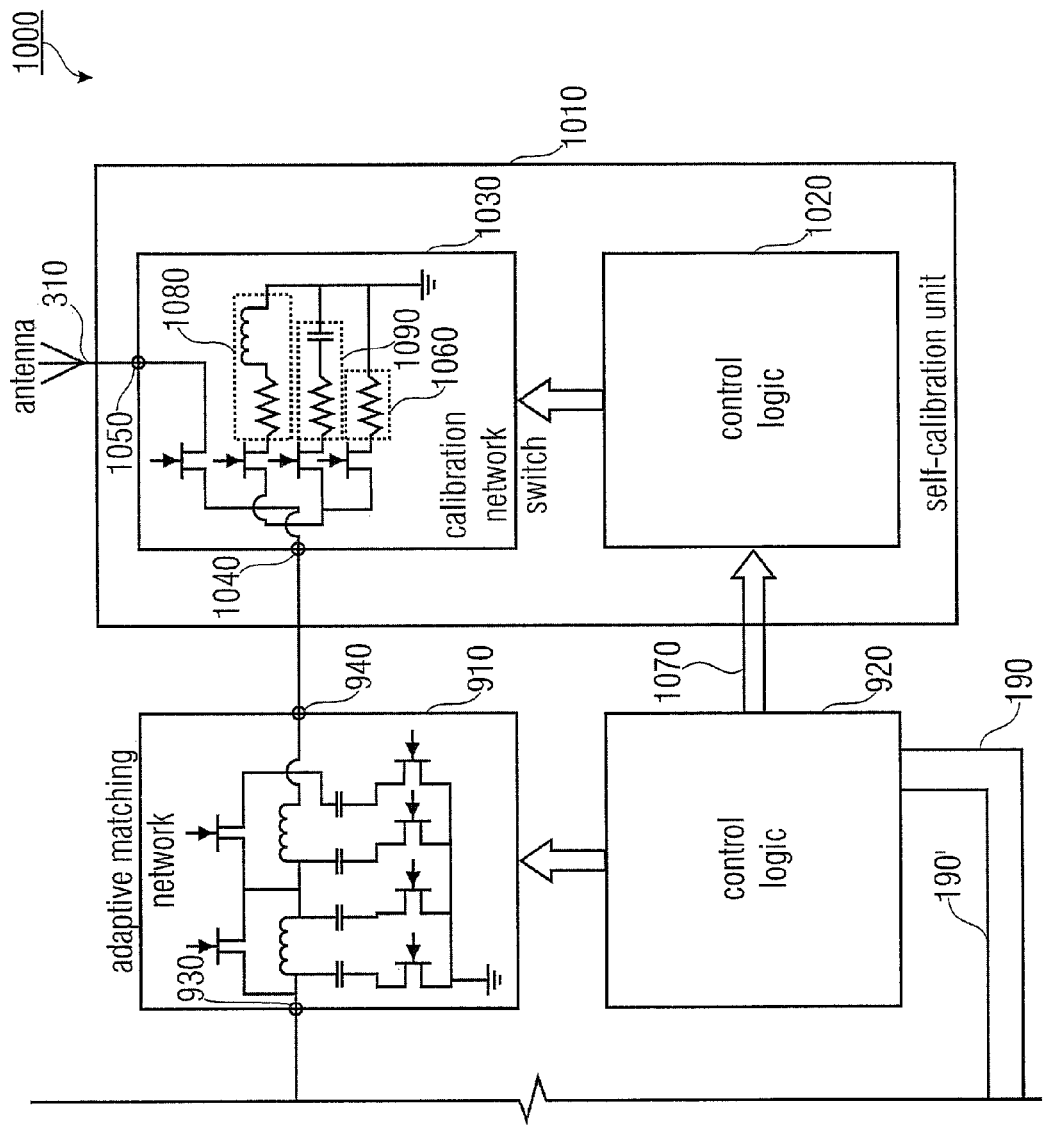

ns to the present invention relate to the field of
HIGH FREQUENCY SWITCHING CIRCUIT AND METHOD FOR DETERMINING A POWER OF A HIGH FREQUENCY SIGNAL

TECHNICAL FIELD

Embodiments to the present invention relate to the field of high frequency switching circuits.

BACKGROUND

High frequency switches are used for passing or blocking high frequency signals. High frequency switches can be realized in different technologies like GaAs technology or MOS technology (MOS=metal oxide semiconductor), however other technologies, like microelectromechanical technologies may be used. High frequency switches are commonly used in all radio frequency applications such as mobile phones.

High data rate systems like UMTS or also new GSM systems bring along the desire to obtain a high precision in impedance matching over a wide range of frequency bands, which leads to a desire for a precise power measurement of high frequency signals, to determine a value of a load impedance of the high data rate systems.

SUMMARY OF THE INVENTION

Embodiments according to the present invention provide a high frequency switching circuit, including a high frequency switching element. The high frequency switching element including a first channel terminal and a second channel terminal, and the high frequency switching element is configured to switchably route a high frequency signal via a channel path between the first channel terminal and the second channel terminal. The high frequency switching circuit further includes a power detection circuit configured to obtain a first measurement signal from the first channel terminal and a second measurement signal from the second channel terminal, and to combine the first measurement signal and the second measurement signal to derive, in dependence on both the first measurement signal and the second measurement signal, a power signal describing a power value of the high frequency signal routed via the channel path of the high frequency switching element.

BRIEF DESCRIPTION OF THE DRAWINGS

Embodiments of the present invention will be explained below in more detail with reference to the accompanying figures, wherein:

FIG. 10 shows a block schematic diagram of a communication apparatus in accordance with an embodiment of the present invention.

DETAILED DESCRIPTION OF ILLUSTRATIVE EMBODIMENTS

Before embodiments of the present invention will be explained in greater detail in the following taking reference to the figures, it is to be pointed that the same or functionally equal elements are provided with the same reference numbers in the figures, and that a repetition of description of these elements shall be omitted. Hence, the description of the elements provides the same reference numbers for elements which are mutually interchangeable and/or applicable in the various embodiments.

Figure 1:
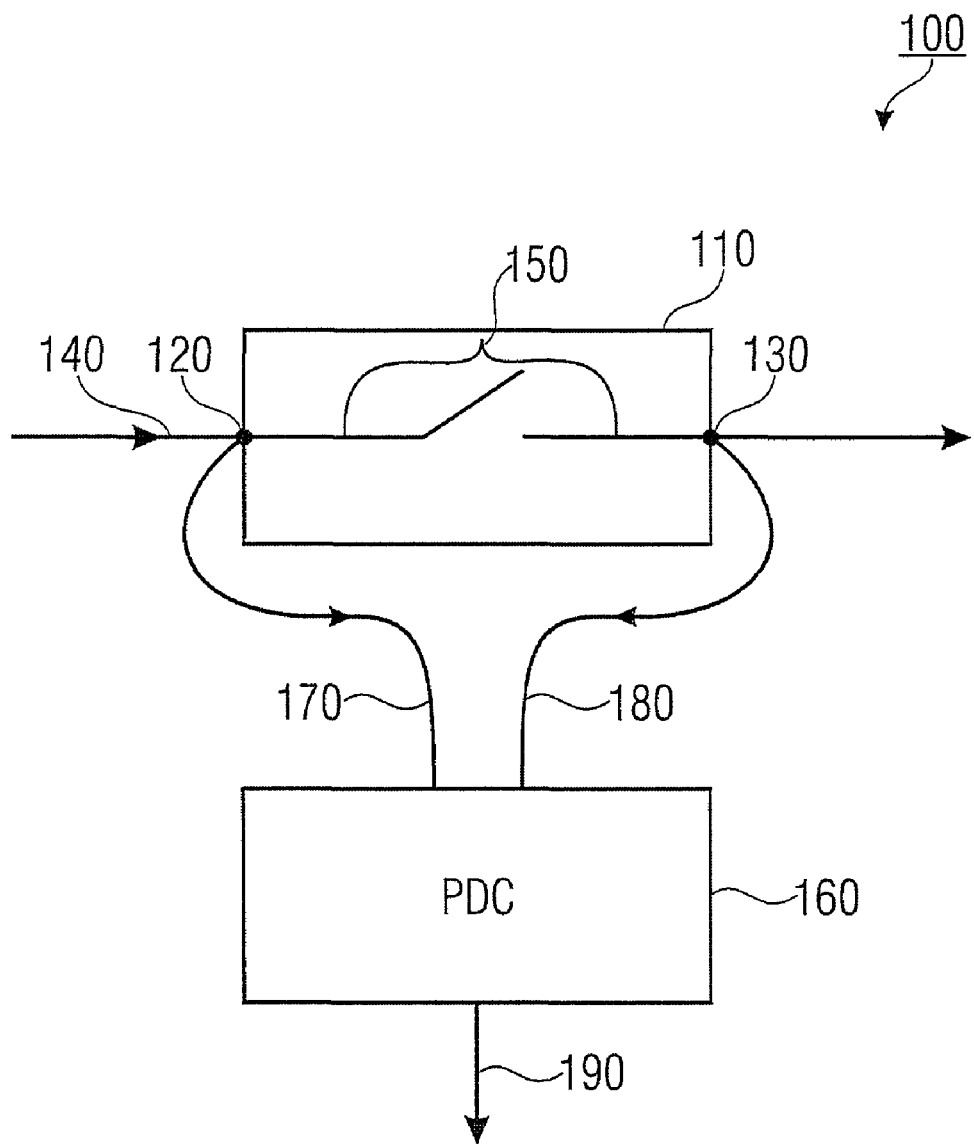
FIG. 1 shows a block schematic diagram of a high frequency switching circuit in accordance with an embodiment of the present invention.

FIG. 1 shows a high frequency switching circuit 100 in accordance with an embodiment of the present invention. The high frequency switching circuit 100 includes a high frequency switching element 110 with a first channel terminal 120 and a second channel terminal 130. A high frequency signal 140 may be routed via a channel path 150 of the high frequency switching element 110. In other words the high frequency switching element 110 is configured to route a high frequency signal 140 via the channel path 150 between the first channel terminal 120 and the second channel terminal 130. The high frequency switching circuit 100 further includes a power detection circuit 160, which is configured to obtain a first measurement signal 170 from the first channel terminal 120 of the high frequency switching element 110 and a second measurement signal 180 from the second channel terminal 130 of the high frequency switching element 110. The power detection circuit 160 is further configured to combine the first measurement signal 170 with the second measurement signal 180 to derive, in dependence on both the first measurement signal 170 and the second measurement signal 180, a power signal 190, wherein the power signal 190 describes a power value of the high frequency signal 140 routed via the channel path 150 of the high frequency switching element 110.

The first measurement signal 170 and the second measurement signal 180 may be obtained by a voltage detection circuit of the power detection circuit 160.

The high frequency switching element 110 may be a high frequency switching transistor 110, for example, wherein the first channel terminal 120 may be a first transistor channel terminal 120 (for example, a drain) and the second channel terminal 130 may be a second transistor channel terminal 130 (for example, a source). The high frequency switching transistor 110 may, for example, be a CMOS transistor, for example, an npn-transistor, wherein the channel path 150 can be an n-channel of the high frequency switching transistor 110, for example placed in a low impedance state by applying a sufficiently high gate voltage to a gate of the high frequency switching transistor 110. The channel path 150 of the high frequency switching transistor 110 may include an on-resistance (for example, smaller than 1 Ohm and preferably smaller than 0.1 Ohm), such that a voltage drop occurs between the first transistor channel terminal 120 and the second transistor channel terminal 130, because the channel path 150 (with an on-resistance) is electrically between the first transistor channel terminal 120 and the second transistor channel terminal 130. Hence, the first measurement signal 170 may differ from the second measurement signal 180 by a voltage difference, depending on a (known) on-resistance of the high frequency switching transistor 110 and a voltage (or current) of the high frequency signal 140. The voltage difference between the first measurement signal 170 and the second measurement signal 180 may give information about a current floating through the channel path 150 of the high frequency switching transistor 110. The current information in combination with the voltage information, for example, from the second measurement signal 180, can be combined by the power detection circuit 160 to a power signal 190, which describes the power of the high frequency signal 140. For deriving the power signal 190 the power detection circuit 160 can combine the first measurement signal 170 and the second measurement signal 180, for example by deriving the voltage difference between the first measurement signal 170 and the second measurement signal 180 and multiplying the voltage difference with the second measurement signal 180 to derive the power value 190 or by directly multiplying the first measurement signal 170 with the second measurement signal 180 to derive the power signal 190.

Because of the very small on-resistance of the channel path 150 of the described high frequency switching transistor, and also because of a limitation of a voltage drop across a single transistor, the high frequency switching element 110 may, according to further embodiments, include a plurality of high frequency switching transistors coupled in series, which means the high frequency signal 140 is routed via the channel paths of the high frequency switching transistors, wherein gates of the high frequency switching transistors may be coupled to a common switch voltage potential to selectively place the channel paths of the high frequency switching transistors in a low impedance state or a high impedance state. The first measurement signal 170 may be obtained from a first transistor channel terminal 120 (for example, a drain) of a first-in-line high frequency switching transistor in the series connection and the second measurement signal 180 may be obtained from a second transistor channel terminal 130 (for example, a source) of a last-in-line high frequency switching transistor in the series connection, wherein a voltage difference between the first measurement signal 170 and the second measurement signal 180, may depend on the sum of the on-resistances (channel paths in a low impedance state) of the channel paths of the high frequency switching transistors. Accordingly a higher voltage difference between the first measurement signal 170 and the second measurement signal 180 is achieved, than in a case in which only one high frequency switching transistor is used to determine the voltage difference between the first measurement signal 170 and the second measurement signal 180. According to some embodiments, the first measurement signal 170 and the second measurement signal 180 may be amplified for further processing.

According to some embodiments, the power signal 190 describing the power of the high frequency signal 140 may be used for determining an impedance value of a load impedance coupled to the second channel terminal 130, for example.

According to some embodiments, the load impedance may be adapted, for example using an adaptive matching network coupled between the second channel terminal 130 and an antenna, to match an impedance of a transceiver coupled to the other side (first channel terminal 120) of the high frequency switching circuit 100, for example.

Hence, embodiments integrate a power detection circuit in a high frequency switching circuit, which may be electrically located at an antenna output, in other words directly coupled to a load impedance terminal.

Figure 2:
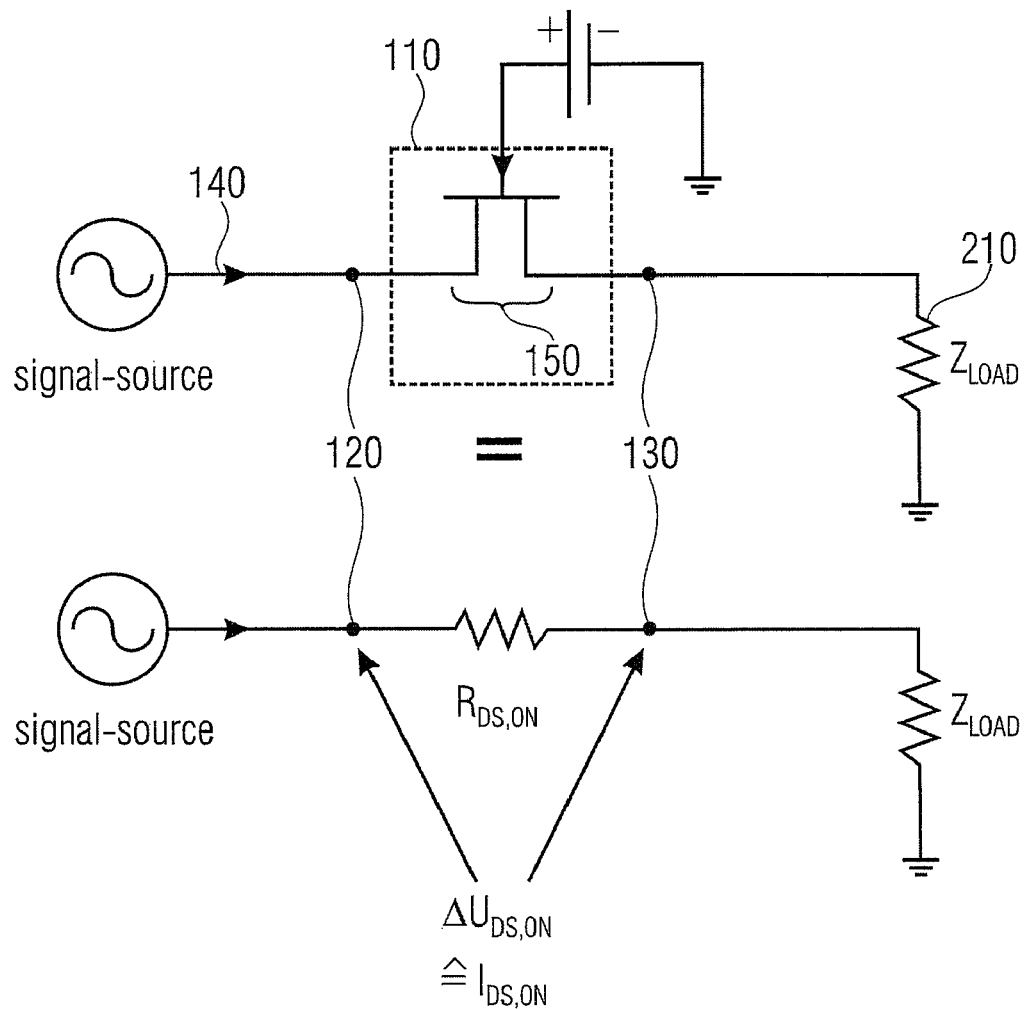
FIG. 2 shows a schematic circuit diagram of a high frequency switching element, which can be used in a high frequency switching circuit in accordance with an embodiment of the present invention.

FIG. 2 shows an equivalent circuit diagram of a high frequency switching transistor, which can be used in a high frequency switching circuit, for example, the high frequency switching circuit 100 according to FIG. 1 in accordance with an embodiment of the present invention. The high frequency switching transistor may be included in a high frequency switching element 110 or may constitute the high frequency switching element 110, wherein a first transistor channel terminal (for example, a drain) of the high frequency switching transistor is coupled to (or constitutes) a first channel terminal 120 of the high frequency switching element 110 and wherein a second transistor channel terminal (for example, a source) of the high frequency switching transistor may be coupled to (or constitutes) a second channel terminal 130 of the high frequency switching element 110. In other words the high frequency switching element 110 may be formed as a high frequency switching transistor 110. Therefore, a high frequency signal may be routed via a channel path 150, wherein the channel path is electrically between the first channel terminal 120 (the first transistor channel terminal) and the second channel terminal 130 (the second transistor channel terminal). The first channel terminal 120 may be coupled to a signal source, for example, a transmitter and the second channel terminal 130 may be coupled to a load impedance 210, for example, an antenna or an adaptive matching network with a coupled antenna. FIG. 2 furthermore shows that the channel path 150 of the high frequency switching transistor 110 can be represented with a resistance RDS-ON, when the channel path 150 is placed in a low impedance state. The resistance RDS-ON leads to a voltage drop ΔUDS-ON between the first channel terminal 120 and the second channel terminal 130, which corresponds to a current IDS-ON of the high frequency signal. In other words, embodiments use the (parasitic) drain source resistance RDS-ON in a series path of an HF switch. Because of the not-ideal small channel resistance of the high frequency switching element (i.e., of the channel path of the high frequency switching element), the resistance can be used to determine a current information of the high frequency signal for the power detection. The voltage drop at RDS-ON is used to obtain the current information of the high frequency signal. The required voltage information of the high frequency signal can be gained directly at the impedance Z_LOAD (at the load impedance terminal 210).

In the following two different methods for detecting the power of a high frequency signal will be shown. A first method uses a differential amplifier for obtaining and amplifying the voltage difference between the first measurement signal 170 and the second measurement signal 180, and a second method directly determines a power information based on the first measurement signal 170 and the second measurement signal 180 with the help of a mixer.

Figure 3:
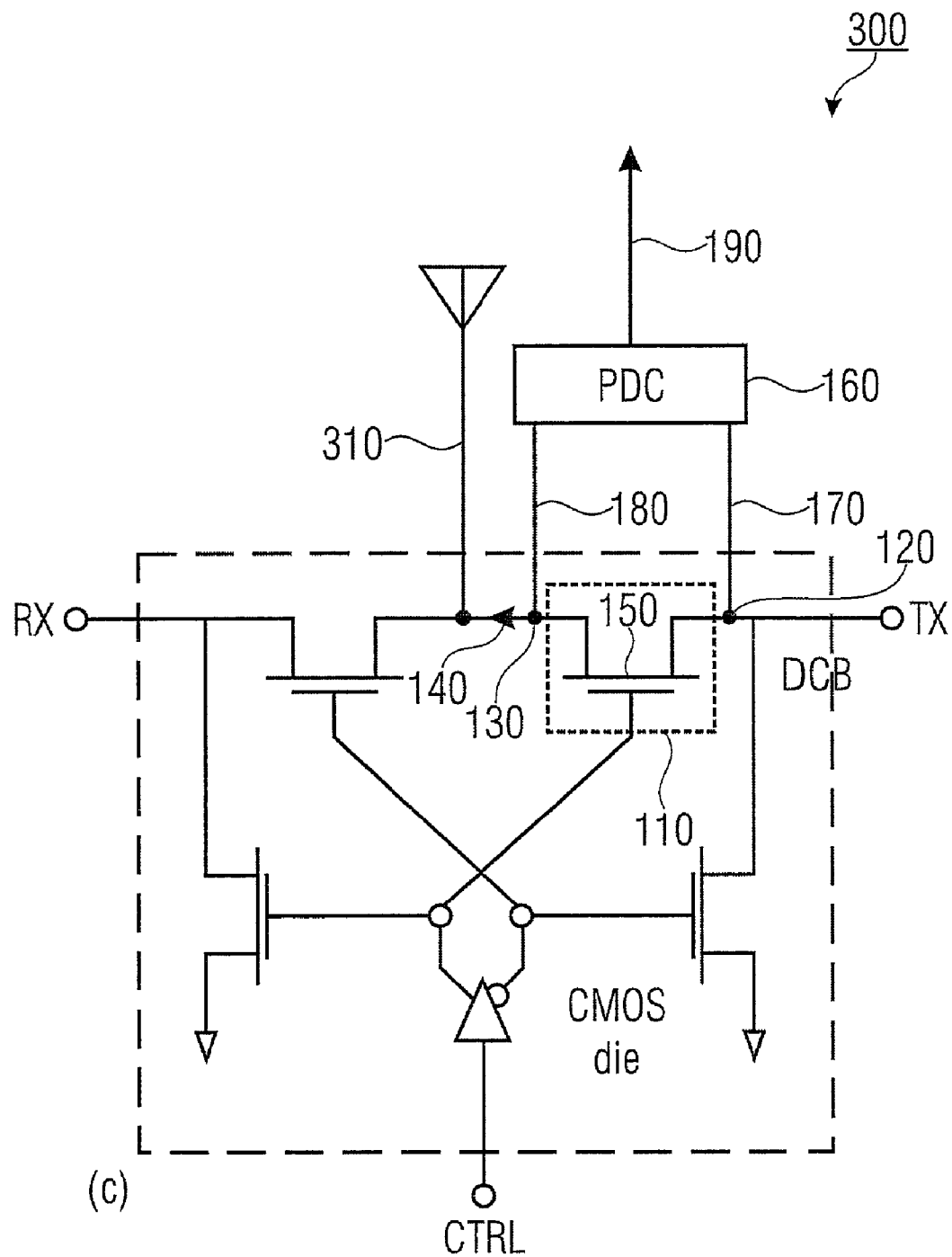
FIG. 3 shows a schematic circuit diagram of a high frequency switching circuit in accordance with an embodiment of the present invention.

FIG. 3 shows a schematic circuit diagram of a high frequency switching circuit 300 in accordance with an embodiment of the present invention. The high frequency switch 300 is realized in a common gate configuration with two paths, a receive (RX) path and a transmit (TX) path. Every path includes two transistors, one so-called series transistor and one shunt transistor. The series transistors are responsible for the connection between an RX-terminal and an antenna 310 (or antenna connection) or a TX-terminal and the antenna 310 (or antenna connection). The shunt transistors are used for an improvement in the isolation. The high frequency switching circuit 300 includes a high frequency switching element 110, is formed as a high frequency switching transistor 110 or in other words the series transistor of the TX path. The first channel terminal 120 is formed as a first transistor channel terminal 120 (for example, a drain) and the second channel terminal 130 is formed as a second transistor channel terminal 130 (for example, a source) of the high frequency switching transistor 110. The channel path 150 of the high frequency switching element is formed as a transistor channel path 150 of the high frequency switching transistor 110, wherein the transistor channel path 150 is electrically between the first transistor channel terminal 120 and the second transistor channel terminal 130. By applying a gate voltage to a gate of the high frequency switching transistor 110 the transistor channel path 150 is placed into a low impedance state, thus a high frequency signal 140 can be routed via the transistor channel path 150, for example, from a TX port of a transmitter to the antenna 310 (or an antenna connection). A power detection circuit 160 is configured to determine a power of the high frequency signal 140, wherein the power detection circuit 160 is configured to obtain a first measurement signal 170 from the first transistor channel terminal 120, and to obtain a second measurement signal 180 from the second transistor channel terminal 130, and to combine the first measurement signal 170 with the second measurement signal 180, to derive a power signal 190, representing the power of the high frequency signal 140.

The power signal 190 may be used for determining an impedance of the antenna 310 and, for example, may be used for matching an impedance of the antenna 310 to an impedance of the transmitter, which may, for example, be coupled to the first transistor channel terminal 120.

Figure 4:
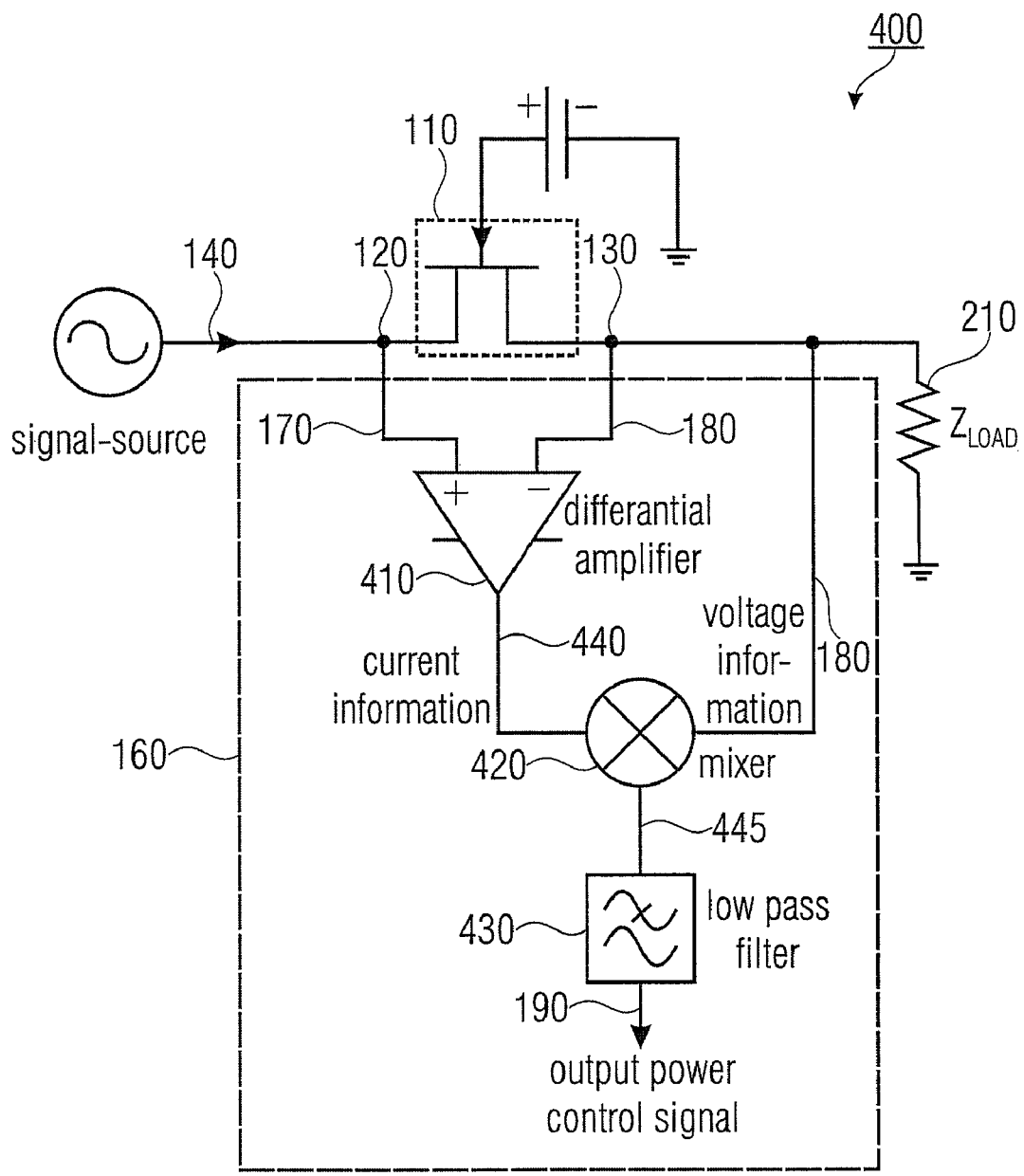
FIG. 4 shows a schematic circuit diagram of a high frequency switching circuit in accordance with an embodiment of the present invention.

FIG. 4 shows a high frequency switching circuit 400 in accordance with an embodiment of the present invention. The high frequency switching circuit 400 includes a high frequency switching transistor 110. A signal source coupled to a first transistor channel terminal 120 and a load impedance 210 is coupled to a second transistor channel terminal 130, as it has already been with reference to FIG. 2. The high frequency switching circuit 400 further includes a differential amplifier 410 and a mixer 420. According to some embodiments, the high frequency switching circuit 400 may further include a low pass filter 430.

The differential amplifier 410 is configured to receive a first measurement signal 170 from a first transistor channel terminal 120 and to receive a second measurement signal 180 from the second transistor channel 130. The differential amplifier 410 is further configured to provide an amplifier output signal 440 in dependence on the difference (e.g., potential difference) between the first measurement signal 170 and the second measurement signal 180. The amplifier output signal 440 may be an amplified version of the difference (e.g., potential difference) between the first measurement signal 170 and the second measurement signal 180. The amplifier output signal 440 may be representing a current or current information of the high frequency signal 140. A first terminal of the mixer may be coupled to an output of the differential amplifier 410 and a second terminal of the mixer 420 may be coupled to the second transistor channel terminal 130 of the high frequency switching transistor 110. In other words, the mixer 420 may be configured to receive the amplifier output signal 440 and the second measurement signal 180 to mix the amplifier output signal 440 with the second measurement signal 180 to provide a mixer output signal 445, wherein the mixer output signal includes a product component of the amplified output signal 440 and the second measurement signal 180. According to some embodiments, the mixer 420 may be configured to multiply the amplified output signal 440, which may be a current information representing a current of the high frequency signal 140 with the second measurement signal 180, which may be a voltage information of the high frequency signal 140, to provide a mixer output signal 445, which includes a product component of the current information of the high frequency signal 140 and the voltage information of the high frequency signal 140.

The product component of the mixer output signal 445 is a measure for the real power of the high frequency signal 140 routed via the channel path 150 of the high frequency switching element 110 (e.g., the high frequency switching transistor 110).

For a further processing of the mixer output signal 445, for example, detecting a voltage of the mixer output signal 445 with an analog to digital (A/D) converter of a microprocessor, it may be necessary to remove high frequency parts of the mixer output signal 445. Therefore the low pass filter 430 may be configured to remove high frequency parts of the mixer output signal 445 to provide a low pass filter output signal 190, the low pass filter output signal 190 including a DC part of the mixer output signal 445, the DC part describing a real power value of the high frequency signal 140 routed via the channel path 150 of the high frequency switching element 110 (e.g., the high frequency switching transistor 110). Therefore the low pass filter output signal may constitute the power signal 190, describing the power of the high frequency signal 140. The power signal 190 may also be called output power control signal 190.

In other words, a voltage drop value between the first transistor channel terminal 120 and the second transistor channel terminal 130 (like shown in FIG. 2) is obtained by the differential amplifier 410 and multiplied with a detected output voltage (represented by second measurement signal 180). The result of this multiplication, is (the mixer output signal 445, which includes a plurality of components of different frequency, wherein a DC-component represents) the real power of the high frequency signal 140. In addition, one gains directly the phase information of the current and the voltage of the high frequency signal for a potential mismatch analysis.

Figure 5A:
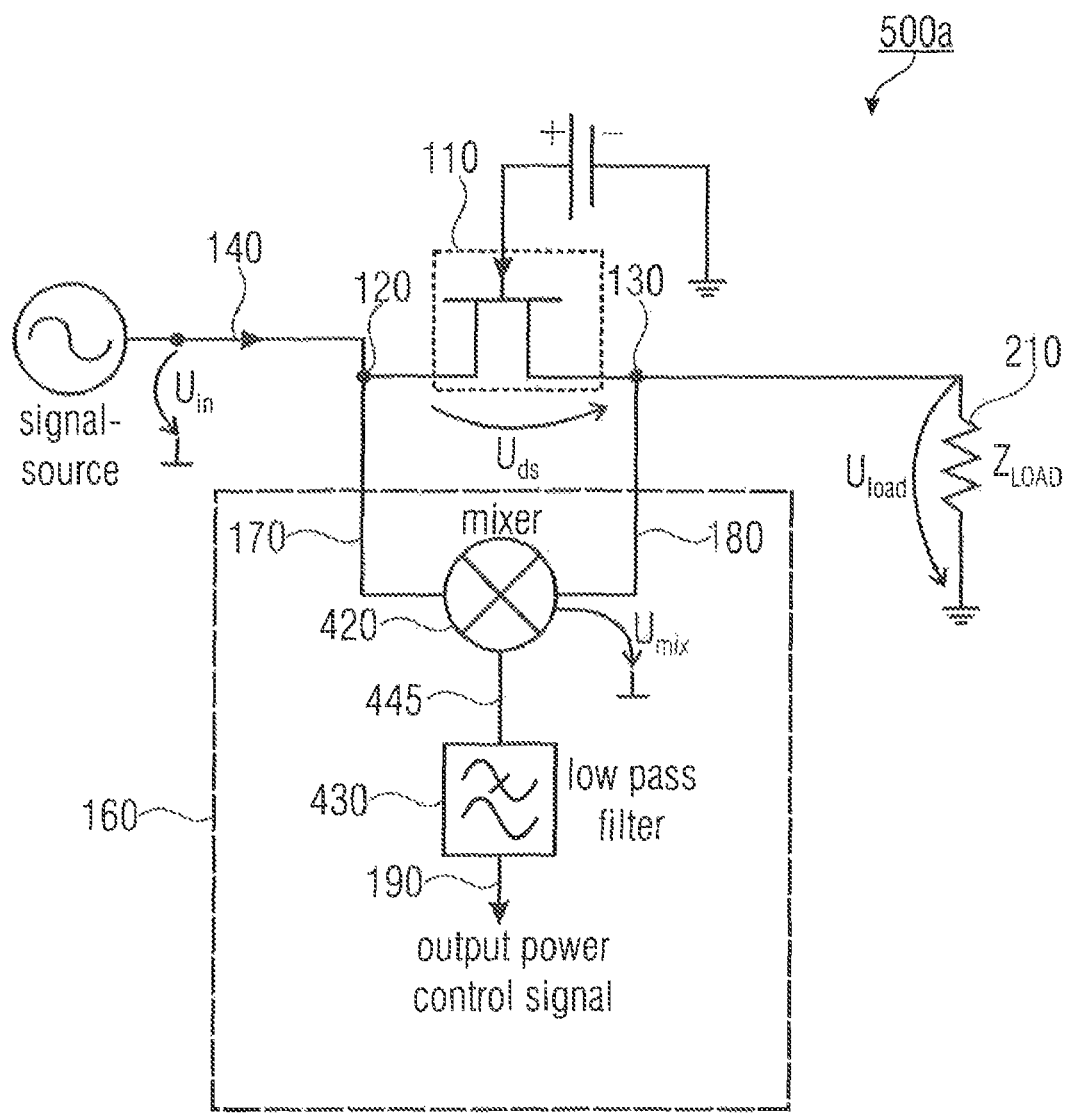
FIG. 5a shows a schematic circuit diagram of a high frequency switching circuit in accordance with an embodiment of the present invention.

FIG. 5a shows a schematic circuit diagram of a high frequency switching circuit 500a in accordance with an embodiment of the present invention. The high frequency switching circuit 500a differs from the high frequency switching circuit 400 shown in FIG. 4 in that a voltage difference between the second measurement signal 180 and the first measurement signal 170 is not obtained. Rather, the first measurement signal 170 and the second measurement signal 180 are directly fed into the mixer 420 to derive a mixer output signal 445. In other words, a first terminal of the mixer 420 is coupled to the first transistor channel terminal 120 of the high frequency switching transistor 110 to receive the first measurement signal 170 and a second terminal of the mixer 420 is coupled to the second transistor channel terminal 130 of the high frequency switching transistor 110 to receive the second measurement signal 180. The mixer 420 is configured to mix (for example, to multiply) the first measurement signal 170 with the second measurement signal 180 to provide a mixer output signal 445 including one or more product component (s) of the first measurement signal 170 and the second measurement signal 180, such that one of the one or more product components is a measure of the real power of the high frequency signal 140 routed via the channel path 150 of the high frequency switching element 110 (e.g., the high frequency switching transistor 110). The mixer output signal 445 may further be fed into a low pass filter 430, wherein the low pass filter 430 may be configured to filter out a high frequency part of the mixer output signal 445, such that a low pass filter output signal includes a DC part, wherein the DC part describes a real power value of the high frequency signal 140. The low pass filter output signal may be the power signal 190 of the high frequency switching circuit 500a.

Assuming:

$$U\text{in}=U^*\sin(\omega t) \quad (1)$$

as input signal (e.g., at the first channel terminal 120), a voltage drop of $$Uds=Rds^*i^*\sin(\omega t+\phi) \quad (2)$$

occurs at the resistance RDS (channel resistance of the channel path 150, between the first channel terminal 120 and the second channel terminal 130), wherein φ describes a phase shift of the first measurement signal 170 and the second measurement signal 180. At the node Z_LOAD, which may be a load impedance terminal 210 to which a load impedance, for example, an adapting matching network and/or an antenna 310, may be coupled a voltage of $$U\text{load}=u^*\sin(\omega t)-i^*Rds^*\sin(\omega t+\phi) \quad (3)$$

can be obtained, with reference to a reference terminal. The multiplication of these two signals (first measurement signal 170 Uin and second measurement 180 Uload) by the mixer 420 leads to:

$$U\text{mix}=u^*\sin(\omega t)^*(u^*\sin(\omega t)-i^*Rds^*\sin(\omega t+\phi))$$

$$U\text{mix}=u^2\sin^2(\omega t)-uiRds^*\sin(\omega t)^*\sin(\omega t+\phi)$$

$$U\text{mix}=u^2\sin^2(\omega t)+\tfrac{1}{2}^*uiRds^*\cos(2\omega t+\phi)-\tfrac{1}{2}^*uiRds^*\cos(\phi) \quad (4)$$

(wherein a proportionality constant, for example, of the mixer 420, has been neglected).

The first part of equation (4) is "constant" (for example, independent on the power, if a predetermined voltage Uin according to equation (1) is assumed) and the second part may be removed by the low pass filter 430 at the output of the mixer 420, because of the double frequency (2ω) in comparison to the input signal and the third part ends in a DC part with a desired power information (only in phase parts are real power). In other words, a real power value of the high frequency signal 140 is described by a DC part of the mixer output signal 445 corresponding to the term $$-\tfrac{1}{2}^*uiRds^*\cos(\phi). \quad (5)$$

To additionally get information about a real and an imaginary part of the load impedance, a second mixer can be used which is coupled by a phase shifter (preferably a 90° phase shifter) to the first mixer. The phase shifter can be a 90° phase shifter to determine the reactive power, describing the imaginary part of the load impedance 210. This is shown in FIG. 5b.

Figure 5B:
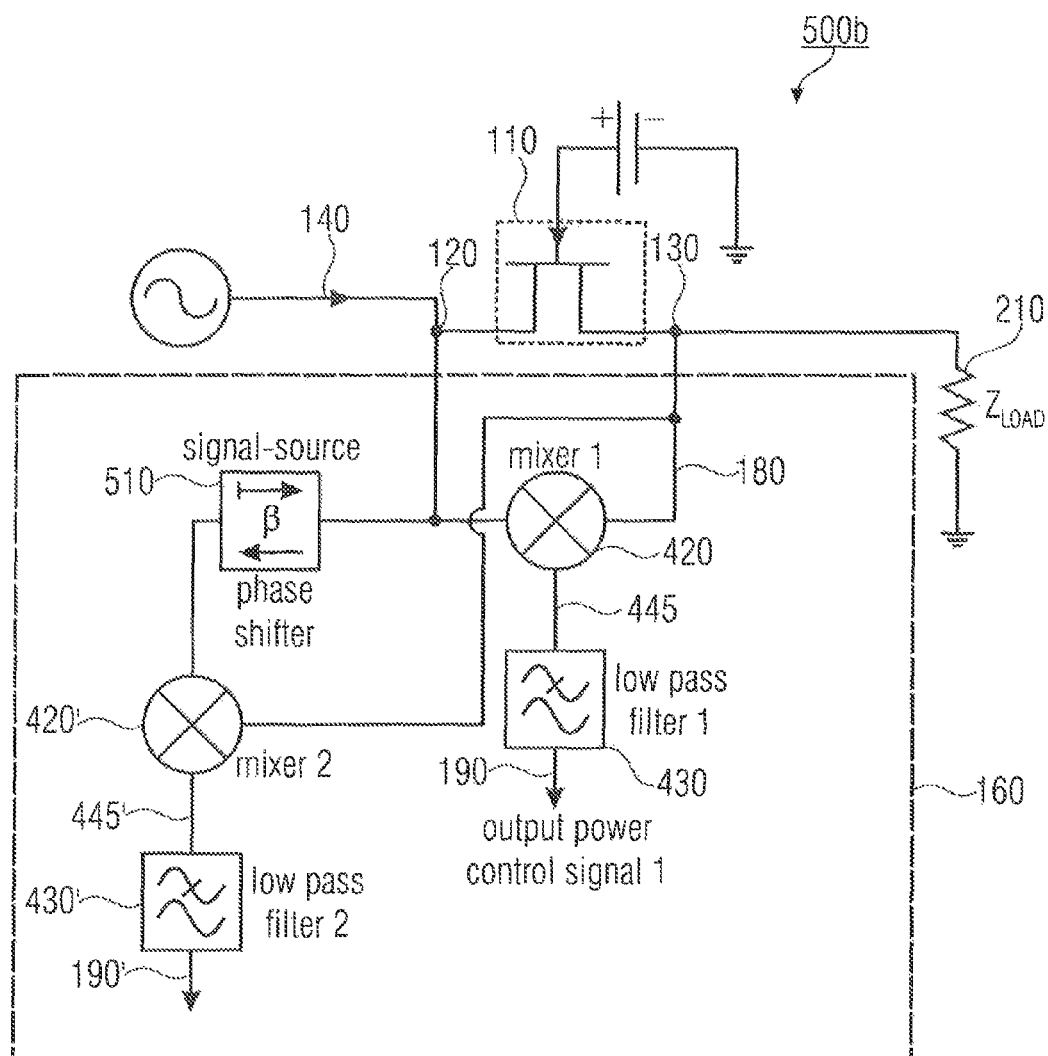
FIG. 5b shows a schematic circuit diagram of a high frequency switching circuit in accordance with an embodiment of the present invention.

FIG. 5b shows a schematic circuit diagram of a high frequency switching circuit 500b in accordance with an embodiment of the present invention. The high frequency switching circuit 500b extends the high frequency switching circuit 500a by a phase shifter 510, a second mixer 420' and a second low pass filter 430'. The power detection circuit 160 is configured to derive a first power signal 190, describing a real power value of the high frequency signal 140, and to derive a second power signal 190', which describes a reactive power value of the high frequency signal 140. The phase shifter 510 is configured to receive the first measurement signal 170 from the first transistor channel 120 and to provide a phase shifted version of the first measurement signal 170. The second mixer 420' is configured to receive the phase shifted version of the first measurement signal 170 and to receive the second measurement signal 180 to mix (for example, multiply) the phase shifted version of the first measurement signal 170 with the second measurement signal 180 to provide a second mixer output signal 445' including one or more product component(s) of the phase shifted version of the first measurement signal 170 and the second measurement signal 180, wherein at least one or more product components is a measure for the reactive power of the high frequency signal 140. The second low pass filter 430' is configured to filter out the high frequency part of the second mixer output signal 445', and to provide a second low pass filter output signal 190' including a DC part of the second mixer output signal 445', the DC part describing a reactive power value of the high frequency signal 140 routed via the channel path 150 of the high frequency switching element 110 (e.g., the high frequency switching transistor 110). The second low pass filter output signal may be the second power signal 190' of the power detection control circuit 160.

According to some embodiments, the first power signal 190 and the second power signal 190' may be used to determine a real value and an imaginary value of the impedance of the load impedance Z_LOAD coupled to the load impedance terminal 210. A load impedance could, for example, be an adaptive antenna matching network together with an antenna 310, wherein the information about the real value and the imaginary value of the impedance value of the load impedance can be used for matching the impedance value of the load impedance to an impedance value at the other side of the high frequency switching circuit, for example, at the first channel terminal 120, for example, an impedance of a transceiver.

Figure 6:
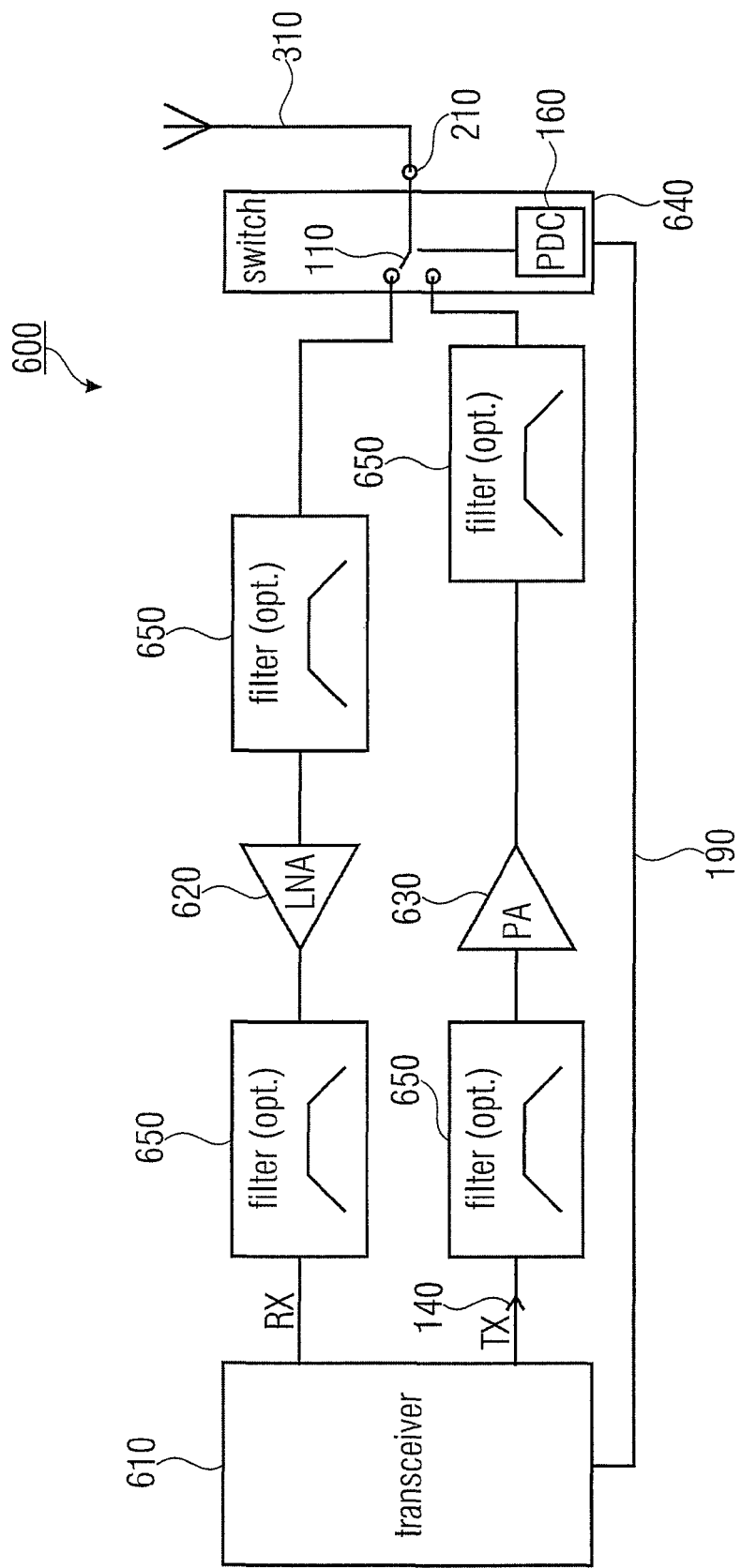
FIG. 6 shows a block schematic diagram of a communication apparatus in accordance with an embodiment of the present invention.

FIG. 6 shows a block schematic diagram of a communication apparatus 600 in accordance with an embodiment of the present invention. The communication apparatus 600 includes a transceiver 610, the transceiver 610 including a high frequency signal output and a high frequency signal input. The communication apparatus 600 also includes a low noise amplifier 620, a power amplifier 630 and a high frequency switching circuit 640, which may be the high frequency switching circuit 300 shown in FIG. 3, for example. The low noise amplifier 620 includes a high frequency signal input and a high frequency signal output, wherein the high frequency signal output is coupled to the high frequency signal input of the transceiver 610. The power amplifier 630 comprises a high frequency signal input and a high frequency signal output, wherein the high frequency signal input is coupled to the high frequency signal output of the transceiver 610. The high frequency switching circuit 640 is configured to switchably route an incoming high frequency signal from a load impedance terminal 210 of the communication apparatus 600 to the high frequency input of the low noise amplifier or to switchably route a high frequency signal 140 from the high frequency power amplifier to the load impedance terminal 210 of the communication apparatus 600. The power detection circuit 160 of the high frequency switching circuit 640 is configured to derive a power signal 190 in dependence of a first measurement signal and a second measurement signal, wherein the power signal 190 describes a power value of the high frequency signal 140. According to some embodiments, the high frequency switching circuit 640 may also be configured to derive a second power signal, which describes a power value of the incoming high frequency signal.

The power signal 190 may be received by the transceiver 610 for an evaluation and/or for an adaption of an impedance value of the transceiver 610 or for an adaption of an impedance value of an adaptive matching network, for example, coupled to the load impedance terminal 210.

According to some embodiments, filter elements 650 may be placed between the high frequency switching circuit 640, the low noise amplifier 620 and the transceiver 610 and also between the transceiver 610, the power amplifier 630 and the high frequency switching circuit 640.

Figure 7:
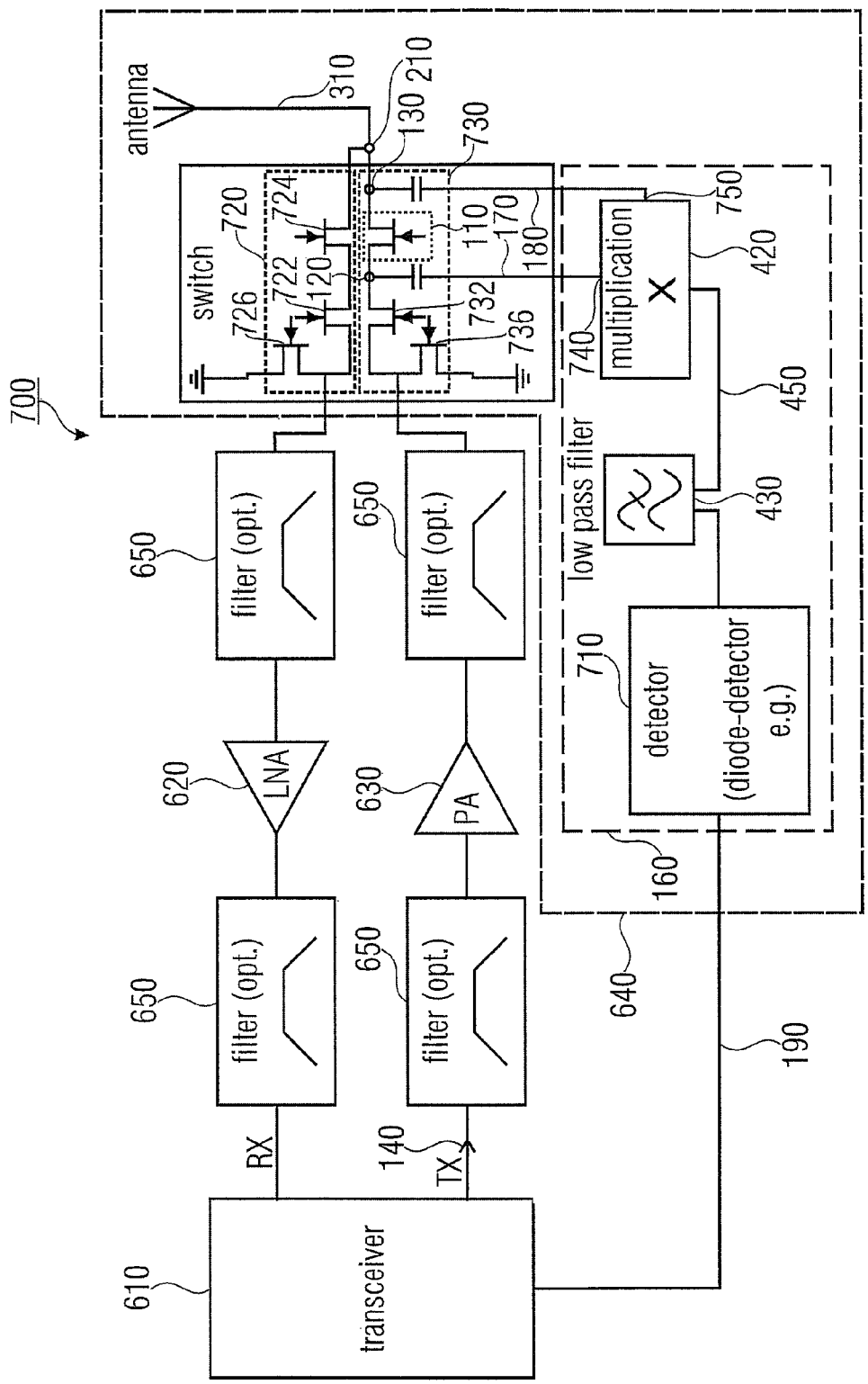
FIG. 7 shows a block schematic diagram of a communication apparatus in accordance with an embodiment of the present invention.

FIG. 7 shows a block schematic diagram of a communication apparatus 700 in accordance with an embodiment of the present invention. The communication apparatus 700 may be the communication apparatus 600 shown in FIG. 6, with a more detailed description of the high frequency switching circuit 640. The high frequency switching circuit 640 is configured to switchably route a high frequency signal from the load impedance terminal 210 to the high frequency signal input of the low noise amplifier 620 or to switchably route a high frequency signal 140 from the high frequency signal output of the power amplifier 630 to the load impedance terminal 210. The high frequency switching circuit 640 includes a receive path 720 to route the incoming high frequency signal from the antenna 310 to the high frequency input of the low noise amplifier 620. The receive path 720 includes two series transistors 722, 724 and one shunt transistor 726. The high frequency switching circuit 640 further includes a transmit path 730 to route the high frequency signal 140 from the high frequency signal output of the power amplifier 630 to the load impedance terminal 210, wherein an antenna 310 or an antenna network may be coupled to the load impedance terminal 210. The transmit path 730 includes two series transistors 732, 110, and one shunt 736 transistor, wherein the high frequency switching element 110 of the high frequency switching circuit 640 constitutes the last-in-line (e.g. a second transistor channel terminal of the last-in-line transistor is coupled to the load impedance 210) transistor 110 of the series transistors 732, 110. Hence, a first channel terminal 120 of the high frequency switching element 110 constitutes a first transistor channel terminal 120 (e.g., a drain) of the series transistor 110 and a second channel terminal 130 of the high frequency switching element 110 constitutes a second transistor channel terminal 130 of the series transistor 110 and a channel path 150 of the high frequency switching element 110 constitutes a transistor channel path 150 of the series transistor 110. In other words, the high frequency switching element 110 constitutes a series transistor (for example, a high frequency switching transistor) 110. The power detection circuit 160 of the high frequency switching circuit 640 includes a mixer 420, a low pass filter 430 and may further include a detector 710 (for example, a diode detector). A first terminal 740 (for example, a first input) of the mixer 420 may be coupled to the first transistor channel terminal 120 via a first coupling capacitor to receive the first measurement signal 170. A second terminal 750 (for example, a second input) of the mixer 420 may be coupled to the second transistor channel terminal 130 via a second coupling capacitor, to receive the second measurement signal 180. The mixer 420 may be configured to mix (for example, to multiply) the first measurement signal 170 with the second measurement signal 180 to provide a mixer output signal including a product component of the first measurement signal 170 and the second measurement signal 180, such that the product component is a measure for the real power of the high frequency signal 140. The mixer output signal may include a DC part, which describes the real power value of the high frequency signal 140 and a high frequency part. Therefore the low pass filter 430 may be configured to filter out (i.e., remove) the high frequency part of the mixer output signal to provide a low pass filter output signal including the DC part of the mixer output signal. The low pass filter output signal may be directly used for evaluation or maybe fed into the detector 710 to remove further high frequency parts, which have not been filtered out by the low pass filter 430, to derive a DC-only power signal 190, which describes the real power value of the high frequency signal 140. The power signal 190 may be directly fed into the transceiver 610 for evaluation purposes.

In other words, to detect the power of a high frequency signal a voltage information and a current information is used. The voltage information can be gained very easily, for example at the antenna 310 (load impedance terminal 210), especially via a coupling capacitor to suppress a DC part of the high frequency signal. The current information can be gained, as mentioned before, by obtaining a voltage drop occurring at a channel path 150 between a first channel terminal 120 and a second channel terminal 130 of a high frequency switching element 110, or, in other words, occurring at a channel path of a series high frequency switching transistor of the high frequency switching circuit. For this purpose, a known RDS_ON resistance of the channel path 150 of the high frequency switching element 110, or of the high frequency switching transistor 110, can be used to directly obtain the current or a current information. Because of very small values of RDS_ON it can be useful to use more than only one device (high frequency switching transistors in the series path), wherein caution must be taken in regards of isolation, and a signal amplification may be necessary. In other words, the first measurement signal 170 and the second measurement signal 180 may be amplified, or at least their difference, before they are fed into the mixer 420. For gaining a higher voltage drop at the high frequency switching element 110, the high frequency switching element 110 may include a plurality of high frequency switching transistors coupled in series, which means a first transistor channel terminal (for example, a drain) of a first-in-line series high frequency switching transistor is constitutes the first channel terminal 120 of the high frequency switching element 110 and a second transistor channel terminal (for example, a source) of a last-in-line high frequency switching transistor, which is last in the series connection may constitute a second transistor channel terminal 130 of the high frequency switching element 110. Using a plurality of high frequency switching transistors in series to switch a high frequency signal path (for example, a TX path or an RX path) leads to higher possible voltages (for example, drain or source voltages) of the high frequency signal routed via the channel paths of the high frequency switching transistors and therefore results in a higher possible output power of an high frequency signal 140. In other words, by obtaining the first measurement signal 170 from a transistor channel terminal of a first-in-line high frequency switching transistor of a series of high frequency switching transistors, (i.e., from a first channel terminal of a high frequency switching circuit, for example, coupled to a transceiver) and, by obtaining the second measurement signal 180 from a second transistor channel terminal of a last-in-line high frequency switching transistor of the series of high frequency switching transistors (i.e., from a second terminal of the high frequency switching circuit, for example, the load terminal impedance 210) the RDS_ON resistances of the channel paths of the series high frequency switching transistors are summed, thus resulting in a higher voltage drop between the first channel terminal 120 and the second channel terminal 130, hence to a higher voltage difference between the first measurement signal 170 and the second measurement signal 180, which leads to an easier determination of the power of the high frequency signal and therefore to an easier determination of an impedance value of a load impedance coupled to the load impedance terminal 210.

According to some embodiments, it is also possible that a device out of the chain (a high frequency switching transistor out of the series connection of high frequency switching transistors) may be coupled to a current mirror to mirror out the current flowing to the channel path of the high frequency switching transistor.

Embodiments avoid detection errors, which occur because of mismatching and a limited directivity of an own directional coupler and its losses. Furthermore, one gains the real power of the signal without errors because of mismatching or the wrong assumption of an ideal ending, in other words ideal termination, which means an ideal matching, for example, 50 Ohm.

Furthermore, embodiments enable an indication about the actual mismatching, by current and voltage detection, for example the mismatching between an impedance presented at the load impedance terminal 210 of the high frequency switching circuit and an impedance of the transceiver 610. In the case of a low ohmic mismatch, a (comparatively) higher voltage drop occurs at the series transistor 110 (the high frequency switching element 110) with its on-resistance RDS_ON, which leads to a reduction of the voltage at the antenna output (at the load impedance terminal 210). Vice versa, a voltage at the antenna output (load impedance terminal 210) may be doubled, at maximum, when a high ohmic mismatch occurs, which leads to a lowering of the current flowing via the series path (via the channel path 150 of the high frequency switching element 110 or of the high frequency switching transistor 110). If the system (the communication apparatus) is calibrated to a reference impedance (for example, 50 Ohm), a mismatching can be gained out of the drop of the real power, for example.

Referring to some embodiments, it is also possible to detect a reactive part (an imaginary part) of the impedance value of a load impedance coupled to the load impedance terminal 210 of the high frequency switching circuit, by detection of the voltages (the first measurement signal 170 and the second measurement signal 180) and their phases relative to each other.

Figure 8:
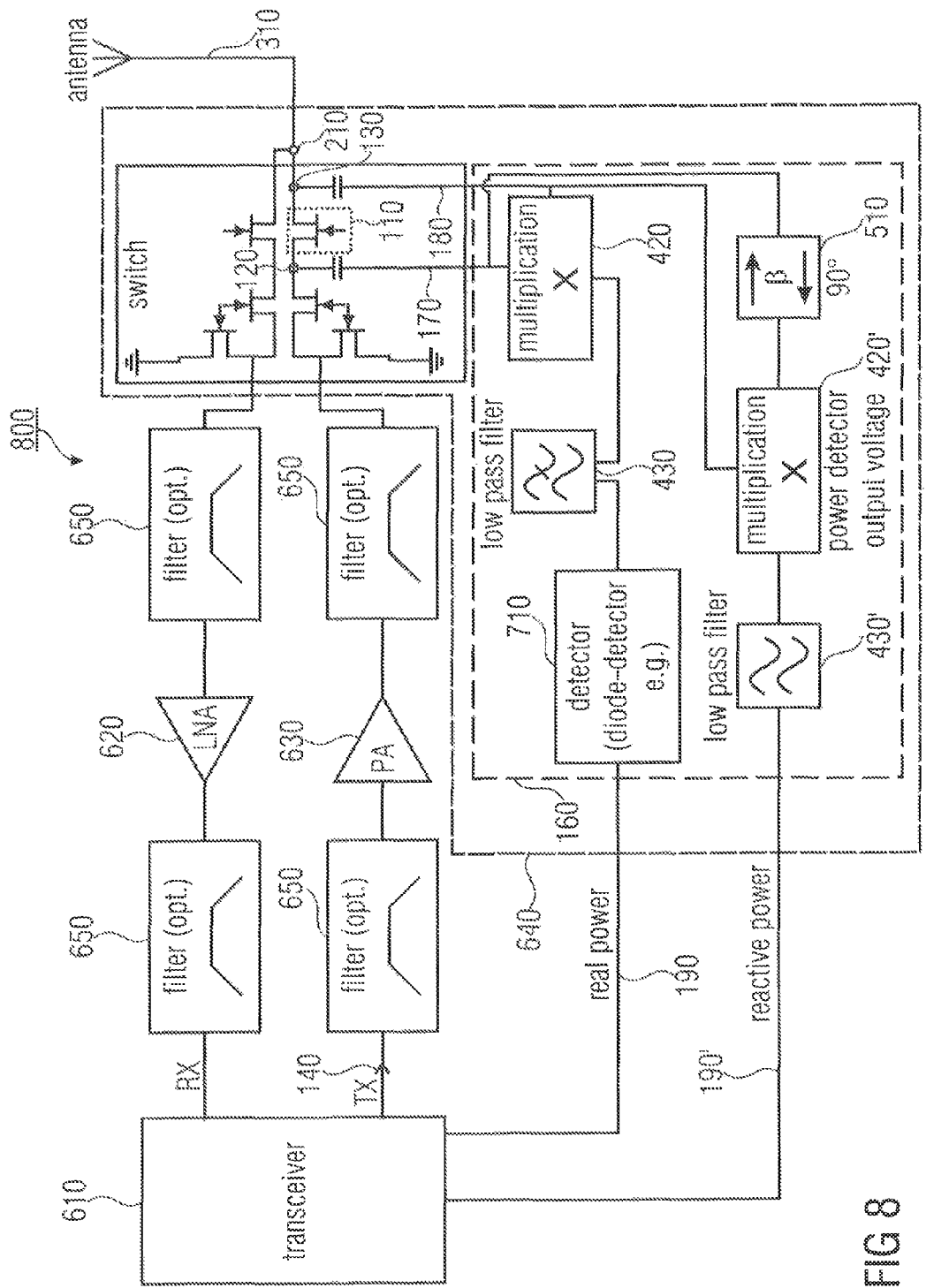
FIG. 8 shows a block schematic diagram of a communication apparatus in accordance with an embodiment of the present invention.

To detect a real and a reactive part of a value of the impedance coupled to the load impedance terminal 210 a detection of the real power and the reactive power of the high frequency signal 140 is necessary, which can be done using a communication apparatus according to FIG. 8.

FIG. 8 shows a communication apparatus 800 in accordance with an embodiment of the present invention. The communication apparatus 800 differs from the communication apparatus 700 shown in FIG. 7 in that the power detection circuit 160 further includes a phase shifter 510, a second mixer 420' and a second low pass filter 430'. The power detection circuit 160 shown in FIG. 7 could, for example, be equal to the power detection circuit 160 according to FIG. 5a and the power detection circuit 160 shown in FIG. 8 of the communication apparatus 800 could, for example, be equal to the power detection circuit 160 shown in FIG. 5b. The power detection circuit 160 of the communication apparatus 800 may therefore be configured to provide a first power signal 190, describing a real power value of the high frequency signal 140 and a second power signal 190', describing a reactive power value of the high frequency signal 140. The phase shifter 510 is configured to receive the first measurement signal 170, and to provide a phase shifted version of the first measurement signal 170, for example, a phase shifted version shifted by 90 degrees, to get the information about the reactive power of the high frequency signal 140. The second mixer 420' may be configured to mix the phase shifted version of the first measurement signal 170 with the second measurement signal 180 to provide a second mixer output signal including a product component of the phase shifted version of the first measurement signal 170 and the second measurement signal 180, such that the product component is a measure for the reactive power of the high frequency signal 140. The second low pass filter 430' may be configured to filter out a high frequency part of the second mixer output signal to provide a second low pass filter output signal including a DC part of the second mixer output signal, the DC part describing a reactive power value of the high frequency signal. The second power signal 190' may therefore be formed as the second low pass filter output signal and may be fed directly into the transceiver 610, for example, in an analog digital converter of the transceiver 610 for further evaluation. The transceiver 610 may be configured to obtain a real value of an impedance coupled to the load impedance terminal 210, based on the first power signal 190 and to obtain an imaginary value of the impedance coupled to the load impedance terminal 210, based on the second power signal 190'. In other words, the communication apparatus 800 according to FIG. 8 enables the detection of the mismatch of a load impedance coupled to the load impedance terminal 210.

Figure 9:
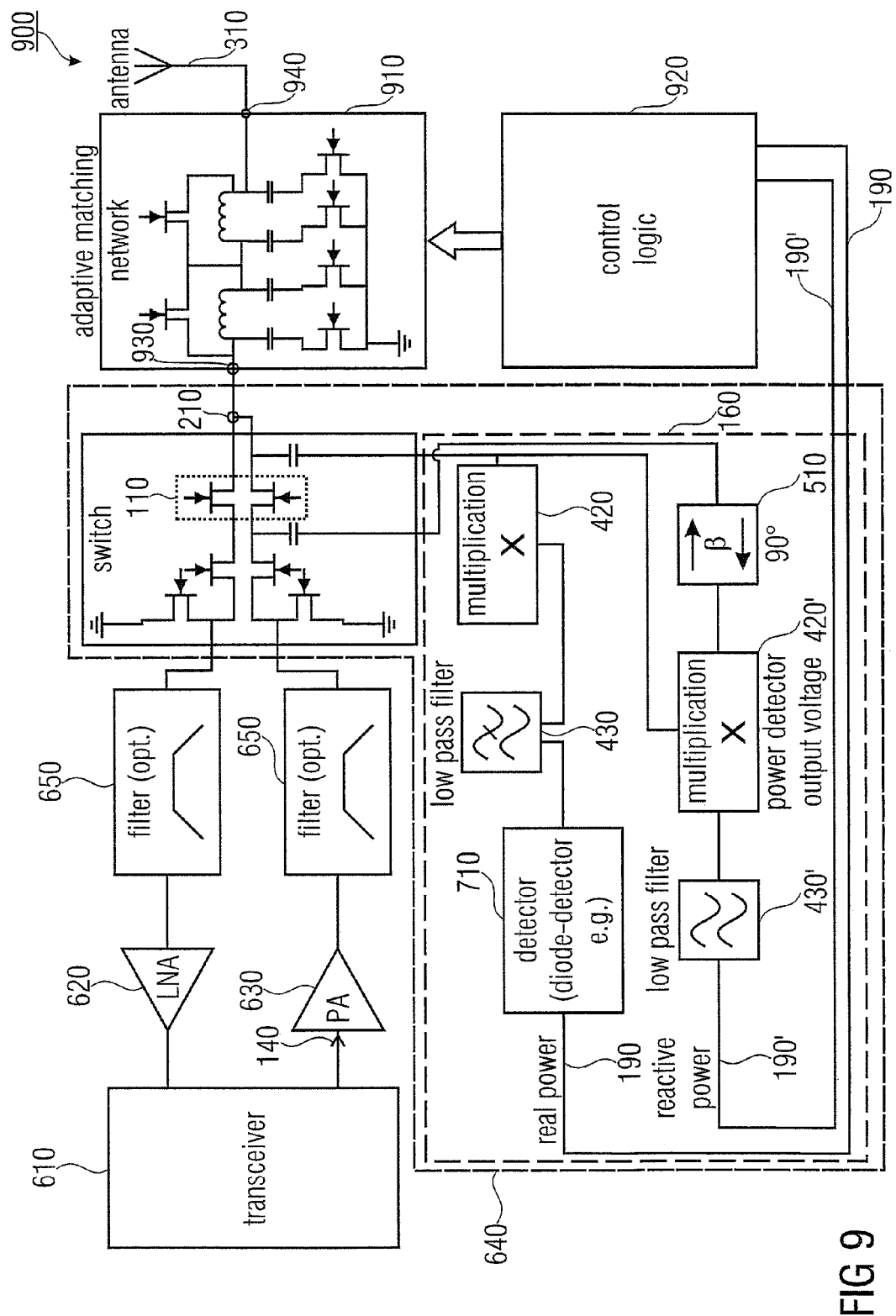
FIG. 9 shows a block schematic diagram of a communication apparatus in accordance with an embodiment of the present invention.

FIG. 9 shows a block schematic diagram of a communication apparatus 900 in accordance with an embodiment of the present invention. The communication apparatus 900 extends the communication apparatus 800 by an adaptive matching network 910 coupled between the load impedance terminal 210 and an antenna 310 and by a control logic 920. In other words the adaptive matching network 910 is coupled to the load impedance terminal 210 of the high frequency switching circuit 640 via a first adaptive matching network terminal 930 and to the antenna 310 via a second adaptive matching network terminal 940. The first power signal 190, describing a real power value of a high frequency signal 140 and the second power signal 190', describing a reactive power value of the high frequency signal 140 are coupled with the control logic 920. The control logic 920 may be configured to gain a real impedance value and an imaginary impedance value of an impedance presented at the load impedance terminal 210, based on both the first power signal 190 and the second power signal 190'. The impedance presented to the load terminal 210 is determined by an impedance of the adaptive matching network 910 and the antenna 310. The control logic 920 may be configured to adapt the real and the imaginary value of the impedance presented at the load impedance terminal 210 to the high frequency switching circuit 640, using the adaptive matching network 910, such that the impedance presented at load impedance terminal 210 is matched to an output impedance of the transceiver 610. The control logic 920 may, for example, adjust the adaptive matching network 910, so that an impedance of 50 Ohm is presented to the high frequency switching circuit 640 at the load impedance terminal 210.

The communication apparatus 900 according to FIG. 9 enables a correction of an impedance mismatch of an impedance presented to the load impedance terminal 210 by detecting a reactive value of the impedance, based on the phase information (e.g., on the phase shift) between the two measurement signals 170, 180, obtaining by detecting a real value of the impedance, based on the voltage information, for example, from the second measurement signal 180. The adaptive matching network 910, which is, for example, a switchable LC network, enables a matching of the impedance, for example, to 50 Ohm, until an optimal (or at least a sufficiently good) matching is reached, for example, maximum real power and minimum reactive power of the high frequency signal 140. The control logic 920 may, for example, switch the adaptive matching network 910 until the phase difference and the voltage difference is minimized or reaches a sufficiently small value.

FIG. 10 shows a block schematic diagram of a communication apparatus 1000 in accordance with an embodiment of the present invention. The communication apparatus 1000 according to FIG. 10 extends the communication apparatus 900 according to FIG. 9 by a self calibration unit 1010. The self calibration unit 1010 includes a second control logic 1020 and a calibration network 1030. A first terminal 1040 of the calibration network 1030 is coupled to the second adaptive matching network terminal 940 of the adaptive matching network 910 and a second terminal 1050 of the calibration network 1030 is coupled to the antenna 310. The second control logic 1020 is configured to switchably couple the second adaptive matching network terminal 940 of the adaptive matching network 910 to the second terminal 1050 of the calibration network 1030 (for example, to the antenna 310) or to at least a first calibration impedance, in dependence on a control signal 1070 received from the first control circuit 920.

In other words, the second control logic 1020 may be configured to switch an impedance presented at the load impedance terminal 210 to a known value, based on the control signal 1070, such that the first control logic 920 can determine reference values of a real power and a reactive power of the high frequency signal 140. Based on the reference values of the real power and the reactive power of the high frequency signal 140, the first control logic 920 may adapt an impedance presented to the load impedance terminal 210, so that a real power value and a reactive power value of the high frequency signal 140 is the same when the antenna 310 is coupled to the second adaptive matching network terminal 940, than when one of the reference impedances is coupled to the second adaptive matching network terminal 940.

In other words, the first control logic 920 may be configured to match the impedance presented to the load impedance terminal 210 by using the adaptive matching network 910, based on reference values gained by switching the second adaptive matching network terminal 940 of the adaptive matching network 910 to reference impedances of the calibration network 1030 using the second control logic 1020.

In other words, if a "normal" is not known (a real power value and a reactive power value) or not determinable in the production, a switching to known impedances behind the adaptive matching network 910 is possible to perform a self calibration. The calibration network 1030 can, for example, include a resistor 1060, a resistor in series with a capacitor 1090 and/or a resistor in series with an inductance 1080 and the second control logic 1020 may be configured to switchably couple the first terminal 1040 of the calibration network 1030 to the second terminal 1050, for example, to the antenna 310 or to the calibration impedances (the resistor 1060, the resistor in series with the capacitor 1090 or the resistor in series with the inductance 1020). In other words, the calibration network 1030 includes three known impedances, a resistive only one 1060 (typically 50 Ohm), a resistive plus capacitive one 1090 and a resistive plus inductive one 1080. A usage of even more reference impedances can lead to higher precision, but this could lead to a higher calibration time and could lead to problems with regard to device tolerances.

In GSM systems the adaptive matching has to be done between the bursts to comply with the specifications. A switching of the adaptive matching network during a burst would lead to a change in amplitude and phase, which leads to a disturbance in the transmission.

Embodiments according to the present invention can be, for example, used in CMOS HF switches or CMOS HF power amplifiers.

Figure 11:
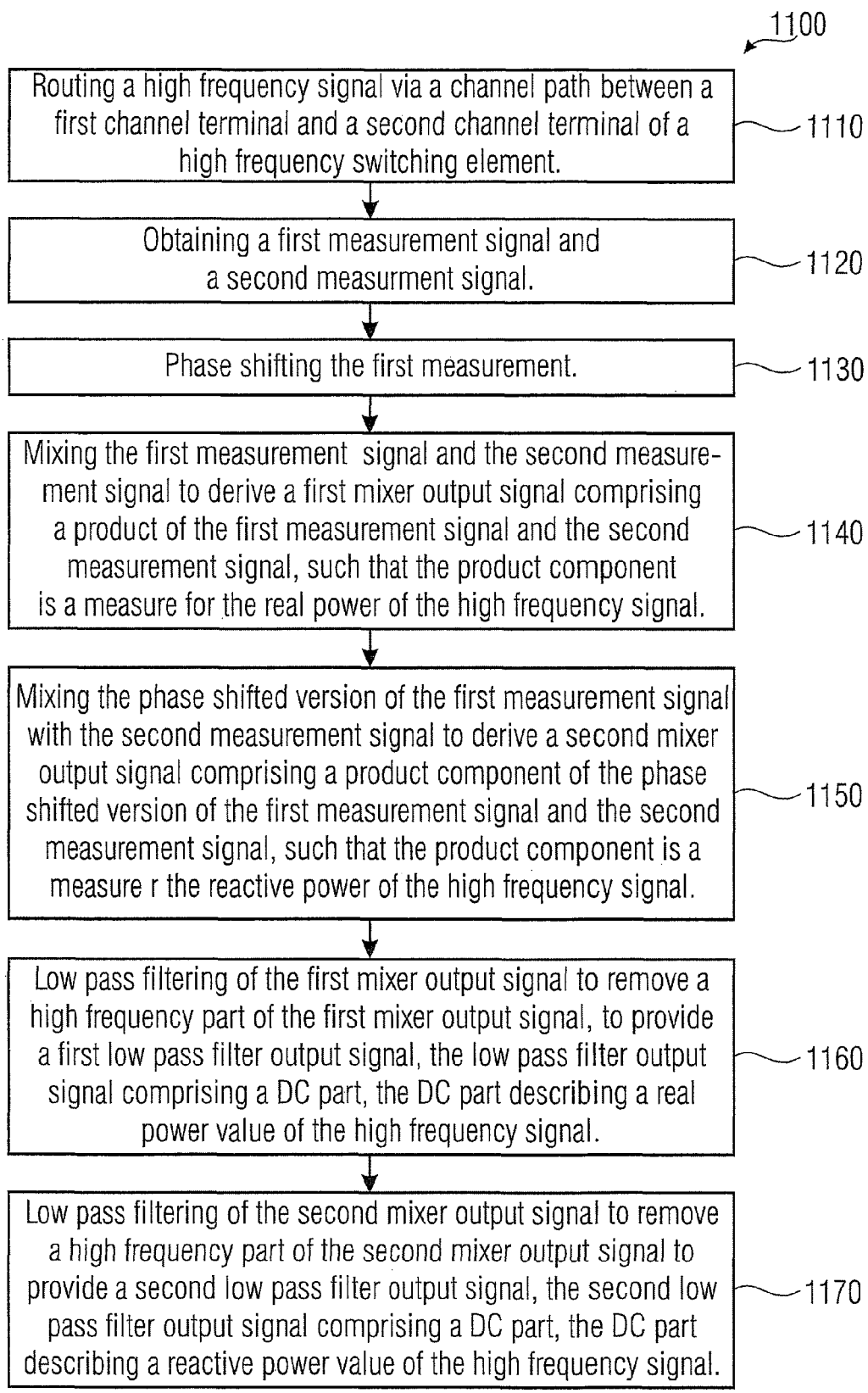
FIG. 11 shows a schematic flow diagram of a method in accordance with an embodiment of the present invention.

FIG. 11 shows a flow diagram of a method 1100 for determining a power of a high frequency signal in accordance with an embodiment of the present invention. The method 1100 comprises step 1110 of routing a high frequency signal via a channel path between a first channel terminal and a second channel terminal of a high frequency switching element.

The method 1100 further comprises a step 1120 of obtaining a first measurement signal from the first channel terminal and obtaining a second measurement from the second channel terminal.

The method 1100 further comprises a step 1130 of phase shifting a first measurement signal, to derive a phase shifted version of the first measurement signal.

The method 1100 further comprises a step 1140 of mixing the first measurement signal and the second measurement signal to derive a first mixer output signal, the first mixer output signal comprising a product component of the first measurement signal and the second measurement signal, such that the product component is a measure for the real power of the high frequency signal.

The method 1100 further comprises a step 1150 of mixing the phase shifted version of the first measurement signal with a second measurement signal to derive a second mixer output signal comprising a product component of the phase shifted version of the first measurement signal and the second measurement signal, such that the product component is a measure for the reactive power of the high frequency signal.

The method 1100 further comprises a step 1160 of low pass filtering of the first mixer output signal to remove a high frequency part of the first mixer output signal, to provide a first low pass filter output signal, the low pass filter output signal comprising a DC part describing a real power value of the high frequency signal.

The method 1100 further comprises a step 1170 of low pass filtering of the second mixer output signal to remove a high frequency part of the second mixer output signal to provide a second low pass filter output signal, the second low pass filter output signal comprising a DC part describing a reactive power value of the high frequency signal.

The method 1100 can be supplemented by any of the features or functionalities and aspects of the devices and apparatuses, described herein.

What is claimed is:

1. A high frequency switching circuit, comprising:
   a high frequency switching element comprising a first channel terminal and a second channel terminal,
   wherein the high frequency switching element is configured to switchably route a high frequency signal via a channel path between the first channel terminal and the second channel terminal; and
   a power detection circuit,
   wherein the power detection circuit is configured to receive a signal from the first channel terminal as a first measurement signal and a signal from the second channel terminal as a second measurement signal and to combine the first measurement signal and the second measurement signal by directly multiplying the first measurement signal with the second measurement to derive, in dependence on both the first measurement signal and the second measurement signal, a power signal describing a power value of the high frequency signal routed via the channel path of the high frequency switching element.

2. The high frequency switching circuit according to claim 1, wherein the channel path of the high frequency switching element comprises an electrical resistance and wherein the first measurement signal differs from the second measurement signal by a voltage difference and wherein a value of the voltage difference is related to a value of the resistance of the channel path.

3. The high frequency switching circuit according to claim 2, wherein the voltage difference describes a current of the high frequency signal and wherein the second measurement signal describes a voltage of the high frequency signal; and
wherein the power detection circuit is configured to obtain the power signal based on both the voltage difference between the first measurement signal and the second measurement signal and the second measurement signal.

4. The high frequency switching circuit according to claim 3, wherein the power signal comprises a DC part, the DC part describing a real power of the high frequency signal.

5. The high frequency switching circuit according to claim 1, wherein the power detection circuit comprises a first mixer;
wherein a first terminal of the first mixer is coupled to the first channel terminal of the high frequency switching element to receive the first measurement signal;
wherein a second terminal of the first mixer is coupled to the second channel terminal of the high frequency switching element to receive the second measurement signal; and
wherein the first mixer is configured to mix the first measurement signal with the second measurement signal to provide a mixer output signal comprising a product component of the first measurement signal and the second measurement signal, such that the product component is a measure for real power of the high frequency signal routed via the channel path of the high frequency switching element.

6. The high frequency switching circuit according to claim 5, wherein the power detection circuit further comprises a first low pass filter;
wherein an input of the first low pass filter is coupled to the first mixer, to receive the mixer output signal of the first mixer; and
wherein the first low pass filter is configured to filter out a high frequency part of the first mixer output signal to provide a first low pass filter output signal, comprising a DC part of the first mixer output signal, the DC part describing a real power value of the high frequency signal routed via the channel path of the high frequency switching element.

7. The high frequency switching circuit according to claim 6, wherein the power detection circuit further comprises a phase shifter, a second mixer and a second low pass filter;
wherein the phase shifter is configured to receive the first measurement signal and to provide a phase shifted version of the first measurement signal;
wherein the second mixer is configured to receive the phase shifted version of the first measurement signal and to receive the second measurement signal, and to mix the phase shifted version of the first measurement signal with the second measurement signal to provide a second mixer output signal comprising a product component of the phase shifted version of the first measurement signal and the second measurement signal, such that the product component is a measure for the reactive power of the high frequency signal routed via the channel path of the high frequency switching element; and
wherein the second low pass filter is configured to filter out a high frequency part of the second mixer output signal to provide a second low pass filter output signal comprising a DC part of the second mixer output signal, the DC part describing a reactive power value of the high frequency signal routed via the channel path of the high frequency switching element.

8. The high frequency switching circuit according to claim 7, wherein the first channel terminal of the high frequency switching element is coupled to the first mixer and the phase shifter via a first couple capacitor, to suppress a DC part of the first measurement signal; and
wherein the second channel terminal of the high frequency switching element is coupled to the first mixer and the second mixer via a second couple capacitor, to suppress a DC part of the second measurement signal.

9. The high frequency switching circuit according to claim 1, wherein the high frequency switching element comprises a high frequency switching transistor;
wherein a first transistor channel terminal of the high frequency switching transistor constitutes the first channel terminal of the high frequency switching element and a second transistor channel terminal of the high frequency switching transistor constitutes the second channel terminal of the high frequency switching element; and
wherein the channel path of the high frequency switching element extends via a transistor channel path of the high frequency switching transistor.

10. The high frequency switching circuit according to claim 1, wherein the high frequency switching element comprises a series connection of a plurality of high frequency switching transistors;
wherein a first transistor channel terminal of a first-in-line high frequency switching transistor out of the plurality of high frequency switching transistors constitutes the first channel terminal of the high frequency switching element, and
a second transistor channel terminal of a last-in-line high frequency switching transistor out of the plurality of high frequency switching transistors constitutes the second channel terminal of the high frequency switching element; and
wherein the channel path of the high frequency switching element extends via channel paths of the series connection of the plurality of high frequency switching transistors.

11. A communication apparatus, comprising:
a transceiver comprising a high frequency signal output and a high frequency signal input;
a low noise amplifier comprising a high frequency signal input and a high frequency signal output, wherein the high frequency signal output of the low noise amplifier is coupled to the high frequency signal input of the transceiver;
a high frequency power amplifier comprising a high frequency signal input coupled to the high frequency signal output of the transceiver and a high frequency output; and
a high frequency switching circuit according to claim 1, wherein the high frequency switching circuit is configured to switchably route an incoming high frequency signal from a load impedance terminal of the communication apparatus to the high frequency input of the low noise amplifier or to switchably route a high frequency signal from the high frequency power amplifier to the load impedance terminal of the communication apparatus;

wherein the power detection circuit is configured to derive the power signal in dependence on the first measurement signal and the second measurement signal, wherein the power signal describes a power value of the high frequency signal.

12. The communication apparatus according to claim 11, wherein the power detection circuit is configured to provide the power signal to a control input of the transceiver.

13. The communication apparatus according to claim 11, wherein the high frequency switching circuit comprises a first mixer and a first low pass filter;

wherein a first terminal of the first mixer is coupled to the first channel terminal of the high frequency switching element of the high frequency switching circuit, to receive the first measurement signal;

wherein a second terminal of the first mixer is coupled to the second channel terminal of the high frequency switching element of the high frequency switching circuit, to receive the second measurement signal;

wherein the first mixer is configured to mix the first measurement signal with the second measurement signal to provide a first mixer output signal comprising a product component of the first measurement signal and the second measurement signal, such that the product component is a measure for real power of the high frequency signal; and wherein the first low pass filter is configured to receive the first mixer output signal to filter out a high frequency part of the first mixer output signal, to provide a first low pass filter output signal comprising a DC part of the first mixer output signal, wherein the DC part describes a real power value of the high frequency signal.

14. The communication apparatus according to claim 13, wherein the power detection circuit further comprises a phase shifter, a second mixer and a second low pass filter, wherein the phase shifter is configured to receive the first measurement signal and to provide a phase shifted version of the first measurement signal;

wherein the second mixer is configured to receive the phase shifted version of the first measurement signal and to receive the second measurement signal and to mix the phase shifted version of the first measurement signal with the second measurement signal to provide a second mixer output signal comprising a product component of the phase shifted version of the first measurement signal and the second measurement signal, such that the product component is a measure for reactive power of the high frequency signal; and wherein the second low pass filter is configured to filter out a high frequency part of the second mixer output signal to provide a second low pass filter output signal comprising a DC part of the second mixer output signal, the DC part describing a reactive power value of the high frequency signal.

15. The communication apparatus according to claim 14, further comprising a first control circuit and an adaptive matching network;

wherein the adaptive matching network is coupled to the load impedance terminal of the high frequency switching circuit, via a first adaptive matching network terminal; and wherein a first control logic is configured to gain a real impedance value and an imaginary impedance value of an impedance presented to the high frequency switching circuit at the load impedance terminal based on both the first low pass filter output signal and the second low pass filter output signal, and to adapt the real and the imaginary value of the impedance presented to the high frequency switching circuit using the adaptive matching network, such that the impedance presented to the high frequency switching circuit at the load impedance terminal is matched to an output impedance of the transceiver.

16. The communication apparatus according to claim 15, further comprising a self calibrating unit;

wherein the self-calibrating unit comprises a calibration network and a second control logic;

wherein the calibration network is coupled to a second adaptive matching network terminal of the adaptive matching network;

wherein the second control logic is configured to switchably couple the second adaptive matching network terminal of the adaptive matching network to an antenna terminal of the communication apparatus or to at least a first calibration impedance of the calibration network, in dependence on a control signal received from the first control circuit; and wherein the first control logic is configured to match the impedance presented to the load impedance terminal of the high frequency switching circuit to the output impedance of the transceiver, by using the adaptive matching network, based on reference impedance values gained by switching the second adaptive matching network terminal of the adaptive matching network to the calibration impedance of the calibration network using the second control logic.

17. The communication apparatus according to claim 16, wherein the calibration network further comprises a second and a third calibration impedance;

wherein the first calibration impedance is formed as a resistor;

wherein the second calibration impedance is formed as a series connection of a resistor and a capacitor;

and the third calibration impedance is formed as a series connection of a resistor and an inductor; and wherein the second control logic is configured to switchably couple the second adaptive matching network terminal of the adaptive matching network to the antenna terminal of the communication apparatus or to the first calibration impedance or to the second calibration impedance or to the third calibration impedance to provide three different values of calibration impedances.

18. A high frequency switching circuit, comprising:

a first high frequency switching transistor comprising a first transistor channel terminal and a second transistor channel terminal, wherein the high frequency switching transistor is configured to switchably route a high frequency signal via a channel path between the first transistor channel terminal and the second transistor channel terminal; and a power detection circuit comprising a first mixer, a second mixer, a first low pass filter, a second low pass filter and a phase shifter;

wherein the first mixer is configured to receive a first measurement signal which is directly fed from the first transistor channel terminal into the first mixer and to receive a second measurement signal which is directly fed from the second transistor channel terminal into the first mixer and to mix the first measurement signal with the second measurement signal to provide a first mixer output signal comprising a product component of the first measurement signal and the second measurement signal, wherein the product component is a measure for real power of the high frequency signal;
wherein the first low pass filter is configured to receive the first mixer output signal and to filter out a high frequency part of the first mixer output signal to provide a first low pass filter output signal,
such that the first low pass filter output signal comprises a DC part, the DC part describing a real power value of the high frequency signal;
wherein the phase shifter is configured to receive the first measurement signal, and to provide a phase shifted version of the first measurement signal;
wherein the second mixer is configured to receive the phase shifted version of the first measurement signal and the second measurement signal and to mix the phase shifted version of the first measurement signal with the second measurement signal to provide a second mixer output signal comprising a product component of the phase shifted version of the first measurement signal and the second measurement signal, such that the product component is a measure for reactive power of the high frequency signal;
wherein the second mixer output signal describes a reactive power of the high frequency signal;
wherein the second low pass filter is configured to receive the second mixer output signal, to filter out a high frequency part of the second mixer output signal, and to provide a second low pass filter output signal; and
wherein the second low pass filter output signal comprises a DC part, the DC part describing a reactive power value of the high frequency signal.

19. A method for determining a power of a high frequency signal, the method comprising:
routing a high frequency signal via a channel path between a first channel terminal and a second channel terminal of a high frequency switching element;
receiving a signal from the first channel terminal as a first measurement signal and receiving a signal from the second channel terminal as a second measurement signal; and
combining the first measurement signal and the second measurement signal by directly multiplying the first measurement signal with the second measurement signal, to derive, in dependence on both the first measurement signal and the second measurement signal, a power signal describing a power value of the high frequency signal routed via the channel path of the high frequency switching element.

20. A method for determining a power of a high frequency signal, the method comprising:
routing a high frequency signal via a channel path between a first channel terminal and a second channel terminal of a high frequency switching element;
obtaining a first measurement signal from the first channel terminal and obtaining a second measurement signal from the second channel terminal;
phase shifting the first measurement signal to derive a phase shifted version of the first measurement signal;
directly feeding the first measurement signal from the first channel terminal and the second measurement signal from the second channel terminal into a mixer;
mixing with the mixer the first measurement signal and the second measurement signal to derive a first mixer output signal comprising a product component of the first measurement signal and the second measurement signal, such that the product component is a measure for real power of the high frequency signal;
mixing the phase shifted version of the first measurement signal with the second measurement signal to derive a second mixer output signal comprising a product component of the phase shifted version of the first measurement signal and the second measurement signal, such that the product component is a measure for reactive power of the high frequency signal;
low pass filtering of the first mixer output signal to remove a high frequency part of the first mixer output signal, to provide a first low pass filter output signal, the low pass filter output signal comprising a DC part, the DC part describing a real power value of the high frequency signal; and
low pass filtering of the second mixer output signal to remove a high frequency part of the second mixer output signal to provide a second low pass filter output signal, the second low pass filter output signal comprising a DC part, the DC part describing a reactive power value of the high frequency signal.

* * * * *